United States Patent [19]
Cody et al.

[11] Patent Number: 5,520,097
[45] Date of Patent: May 28, 1996

[54] MOLDED FOOD PROCESSING SYSTEM

[75] Inventors: Daniel J. Cody, Prairie du Sac; Wendell J. Holl, Lodi, both of Wis.

[73] Assignee: DEC International, Inc., Madison, Wis.

[21] Appl. No.: 356,673

[22] Filed: Dec. 15, 1994

[51] Int. Cl.⁶ .................................. A21B 5/00; A47J 37/00
[52] U.S. Cl. ......................... 99/353; 99/373; 99/427; 99/443 C
[58] Field of Search ..................... 99/427, 477, 478, 99/443 C, 353, 373; 198/494, 496, 497

[56] References Cited

U.S. PATENT DOCUMENTS 4,111,109  9/1978  Sakurazawa ........................ 99/353
4,862,790  9/1989  Platteschorre et al. ............... 99/427
5,016,528  5/1991  Chen ................................ 99/427

Primary Examiner—Stephen F. Gerrity
Assistant Examiner—Reginald L. Alexander
Attorney, Agent, or Firm—Andrus, Sceales, Starke & Sawall

[57] ABSTRACT

A food processing system (20) includes a plurality of openable and closeable food product molds (32, 34) carried by a continuous serpentine conveyor (24) through a processing chamber (22) from a loading station (28) to an unloading station (30) and then returned by the conveyor from the unloading station to the loading station. An automatic mold opener (62) opens the mold at the unloading station. An automatic mold closer (64) closes the mold at the loading station, eliminating mold handling and storage by operating personnel.

23 Claims, 8 Drawing Sheets

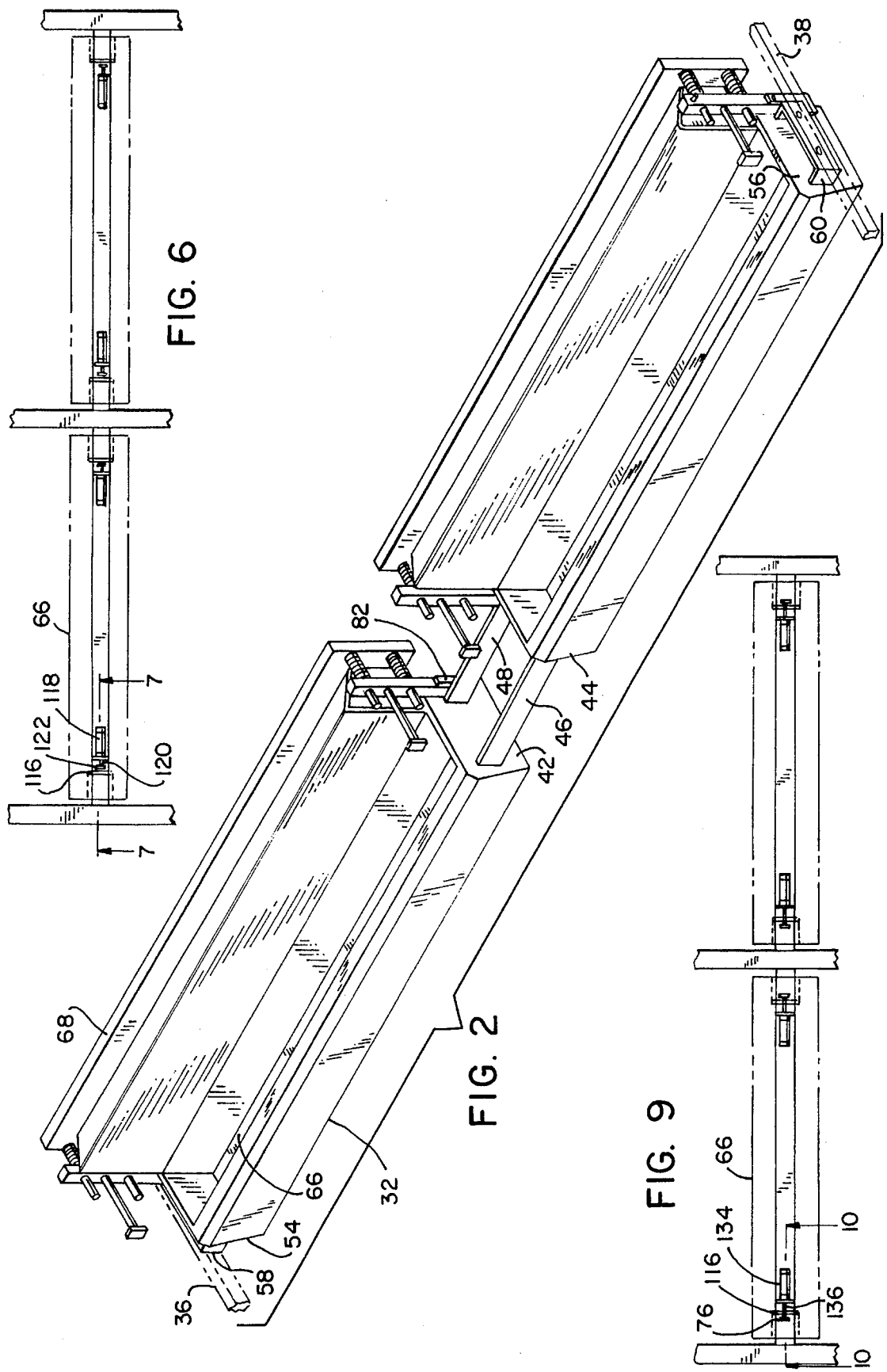

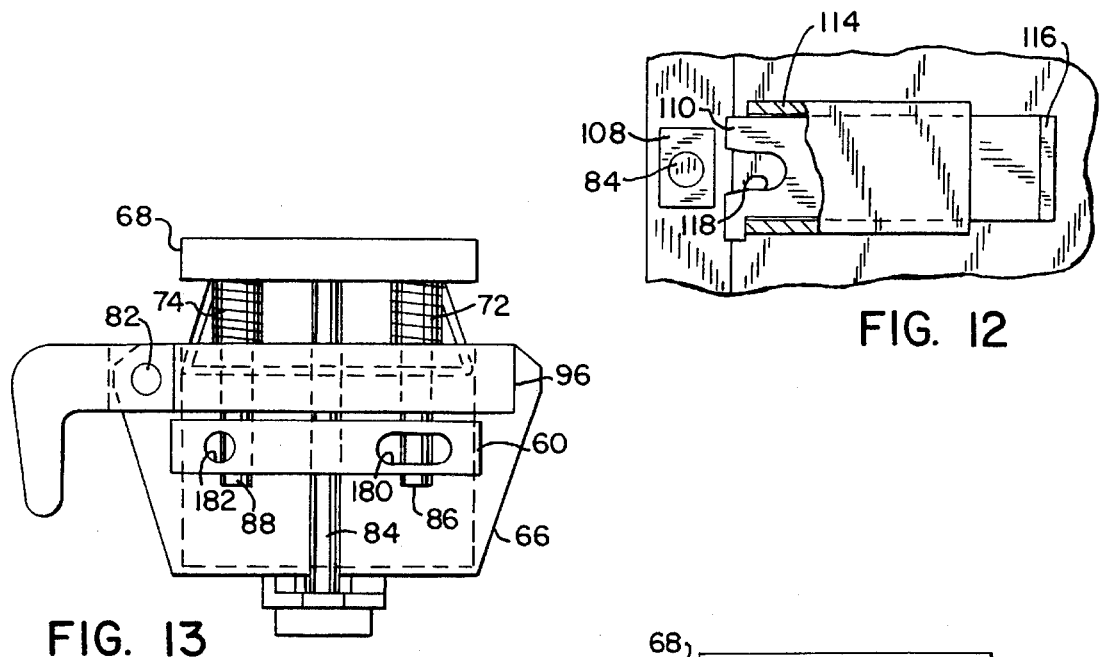
FIG. 12
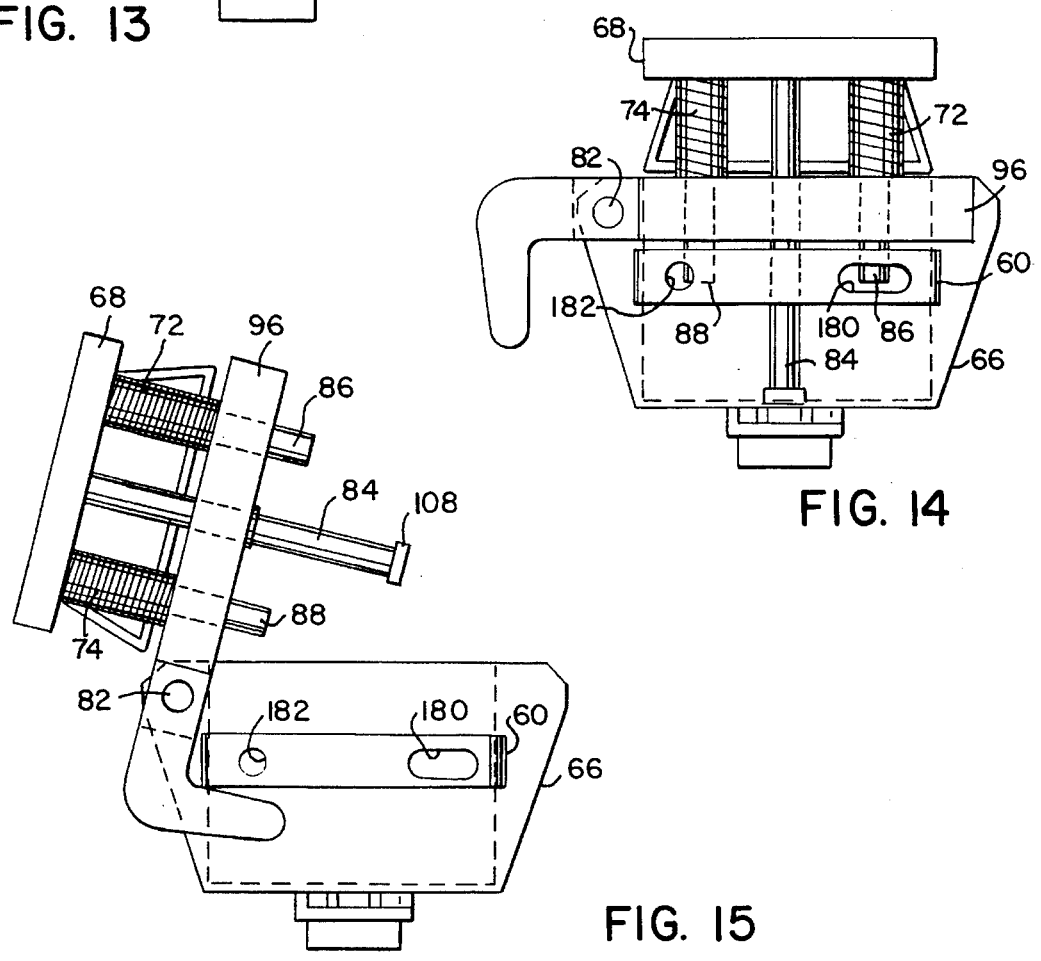
FIG. 13
FIG. 14
FIG. 15

MOLDED FOOD PROCESSING SYSTEM

BACKGROUND AND SUMMARY

The invention relates to food processing systems having a conveyor transporting a food product in a mold through a processing chamber, for example to cook or chill the food product.

The invention arose during continuing development efforts relating to, and is particularly useful in conjunction with, continuous serpentine conveyor systems, which are known in the art, for example as shown in U.S. Pat. No. 5,253,569, incorporated herein by reference. A serpentine food processor typically employs a continuous serpentine chain conveyor for transporting the food product through a processing chamber. The chamber has a predetermined temperature and environment for processing the food product, such as for cooking or chilling the product. The serpentine path provides a plurality of parallel flights connected at their ends by U-shaped bends. Each piece of food product carried by the serpentine conveyor is exposed to the same conditions of cooking or chilling as the piece of product ahead of or behind it. This provides a high degree of product uniformity, which results in high yields and extended shelf life of the product. In the processing chamber, cooking heat may be provided by steam, hot water, hot air or the like, and chilling may be provided by a tap water shower, recirculated brine or glycol, cooled air or the like.

The present invention particularly arose during development efforts directed toward a molded ham cooker. The ham product is in a bag, which bag is loaded into a shaping mold, e.g. 4 inches by 6 inches by 60 inches to form a loaf which is later sliced. A plurality of molds are carried by a conveyor through a processing chamber from a loading station to an unloading station and then returned by the conveyor from the unloading station to the loading station. The molds remain with the conveyor in the processing chamber. The bagged ham product is loaded into a mold at the loading station by an operator, and is removed or ejected from the mold at the unloading station. During cooking, the bagged ham takes the shape of the mold.

The invention provides various improvements in food processing systems, and has numerous applications. A particularly desirable advantage of the invention is that it eliminates mold handling and storage by operating personnel.

BRIEF DESCRIPTION OF THE DRAWINGS

FIG. 2 is an isometric view of a pair of food product molds carried by the conveyor in the food processing system of FIG. 1.

FIG. 6 is a sectional view taken along line 6—6 of FIG. 5.

FIG. 9 is a sectional view taken along line 9—9 of FIG. 8.

FIG. 12 is a sectional view taken along line 12—12 of FIG. 10.

FIG. 13 is an end view of the structure of FIGS. 7 and 10, showing the mold in a closed position.

FIG. 14 is like FIG. 13 and shows the mold in a partially open sprung position.

FIG. 15 is a view like FIGS. 13 and 14 and shows the mold in an open position.

DETAILED DESCRIPTION

Figure 1:
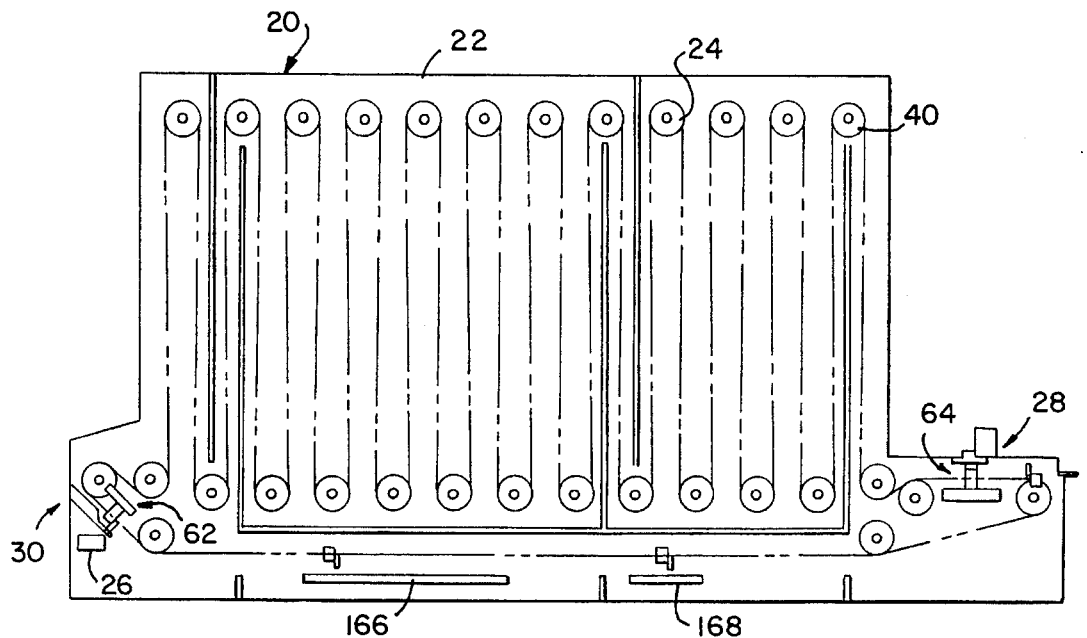
FIG. 1 is a longitudinal cross-sectional view of a food processing system in accordance with the invention.
Figure 3:
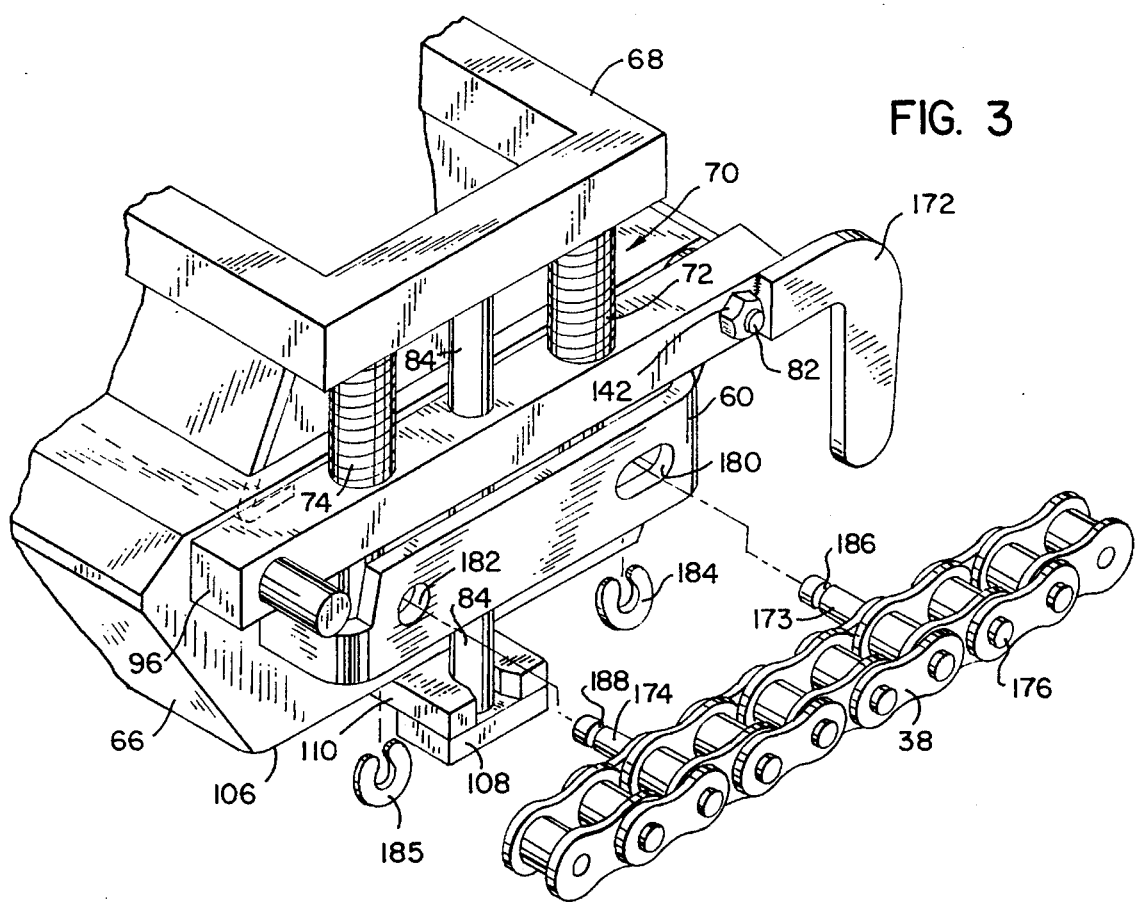
FIG. 3 is an isometric view of a portion of a food product mold and conveyor chain drive therefore.
Figure 4:
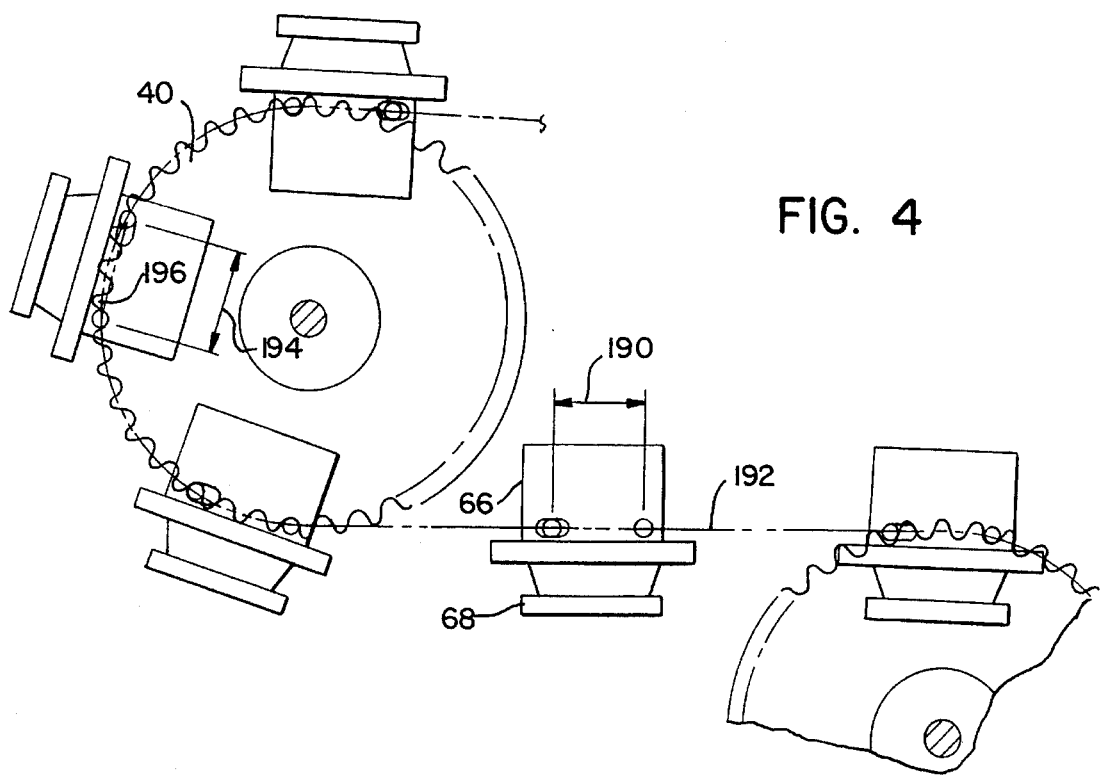
FIG. 4 is a partially schematic view illustrating a portion of the conveyor of FIG. 1.

FIG. 1 shows a food processing system 20 including a food processing chamber 22 and a conveyor 24 in the chamber for transporting a food product 26 there-through between a loading station 28 and an unloading station 30. A plurality of openable and closable food product molds, two of which are shown in FIG. 2 at 32 and 34, are carried by conveyor 24 through chamber 22 from loading station 28 to unloading station 30 and then returned by the conveyor from unloading station 30 to loading station 28. The conveyor is provided by a continuous serpentine conveyor having a pair of distally opposite chains 36 and 38, FIGS. 2 and 3, conveyed around respective first and second sets of distally opposite sprockets, one of which is schematically illustrated in FIG. 4 at 40. The mold extends transversely between the chains and is mounted thereto by respective brackets in a fixed orientation relative to the chains. A single mold may extend transversely between the chains, or, in the preferred embodiment, a pair of molds 32 and 34, FIG. 2, extend end-to-end between the chains. In FIG. 2, each mold is 4 inches by 6 inches, to provide desired ham loaf cross-sectional dimensions, and is 60 inches long. The distance between chains 36 and 38 is about 132 inches. Molds 32 and 34 have respective first ends 42 and 44 facing each other and mounted to each other in fixed orientation by welded plates 46 and 48 extending between respective ends 42 and 44. Molds 32 and 34 have second distally opposite respective ends 54 and 56 each mounted to a respective chain 36 and 38 by a respective bracket 58 and 60. This provides a double mold system.

Figure 16:
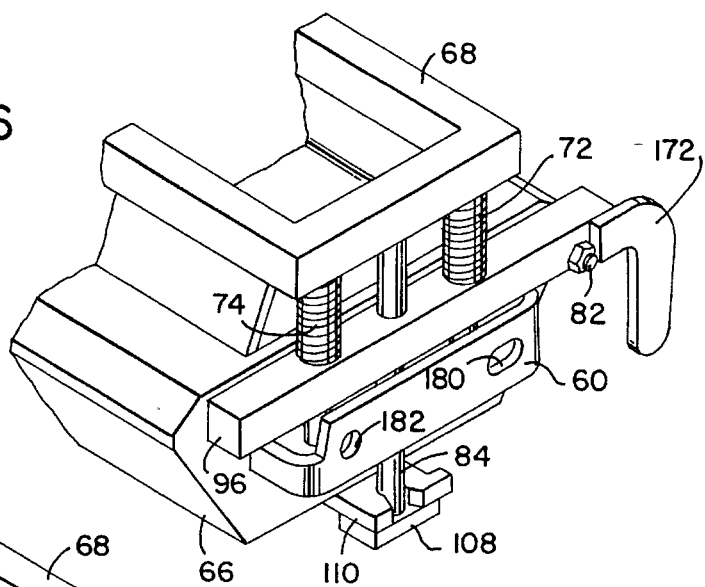
FIG. 16 is an isometric view similar to FIG. 3 and shows the mold in a closed position.
Figure 17:
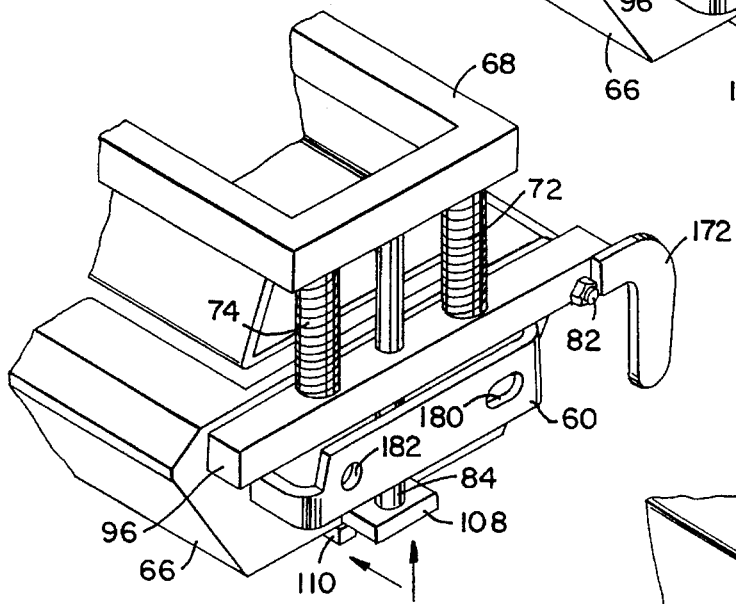
FIG. 17 is like FIG. 16 and shows the mold in a partially open sprung position.
Figure 18:
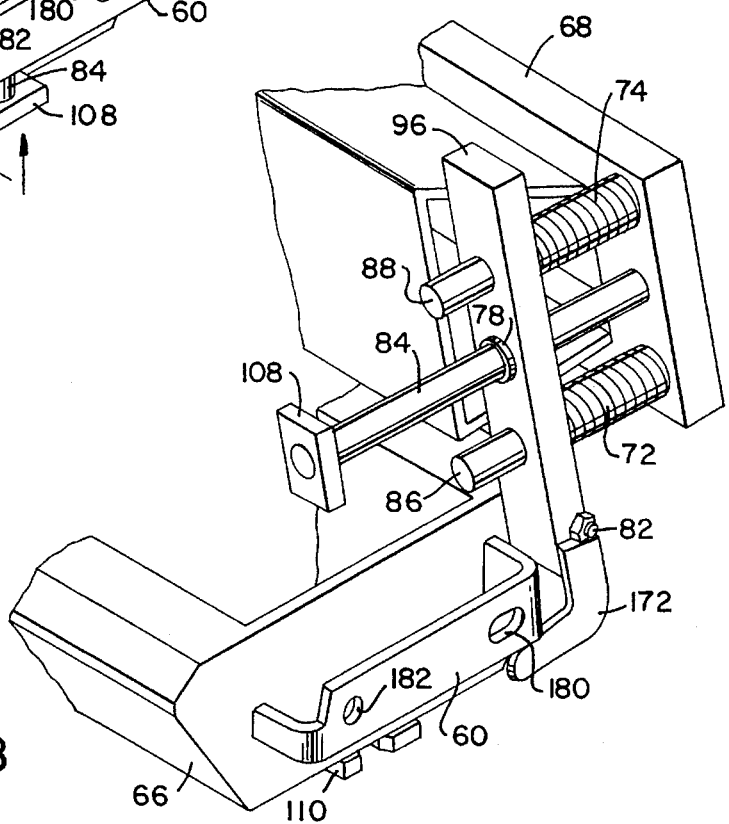
FIG. 18 is like FIGS. 16 and 17 and shows the mold in an open position.

During transport movement of the mold by the conveyor, the mold is automatically opened by a mold opener 62 at unloading station 30, and is automatically closed by a mold closer 64 at loading station 28. Each mold is provided with an open receptacle 66, FIG. 2, having a lid 68 mounted thereto and movable between a first open position leaving the receptacle open, FIGS. 2, 15, 18, and a second closed position closing the receptacle, FIGS. 3, 13, 16. Each receptacle has a latch 70, FIG. 3, latching the lid in the closed position. Mold closer 64 automatically closes the lid and latches the latch. Mold opener 62 automatically unlatches the latch. Latch 70 is spring loaded by springs 72 and 74 and biased to an unlatched position. Mold opener 62 includes a latch release 76, FIG. 10, engaging and releasing the latch, and a retainer 78 retaining lid 68 in a partially open sprung position, FIGS. 10, 14, 17, to be described. A retention member 80, FIG. 8, engages lid 68 in the noted partially open sprung position and prevents movement of the lid to its open position until the mold traverses past retention member 80 at unloading station 30.

Lid 68 is mounted to receptacle 66 for compound movement, including pivotal movement and translational movement. The pivotal movement is about pivot axis 82, FIG. 3, between the noted open position, FIGS. 2, 11, 15, 18, and the noted partially open sprung position, FIGS. 10, 14, 17. The translational movement is along the axis of rod 84 between the partially open sprung position and the noted closed position, FIGS. 3, 7, 13, 16.

Figure 3A:
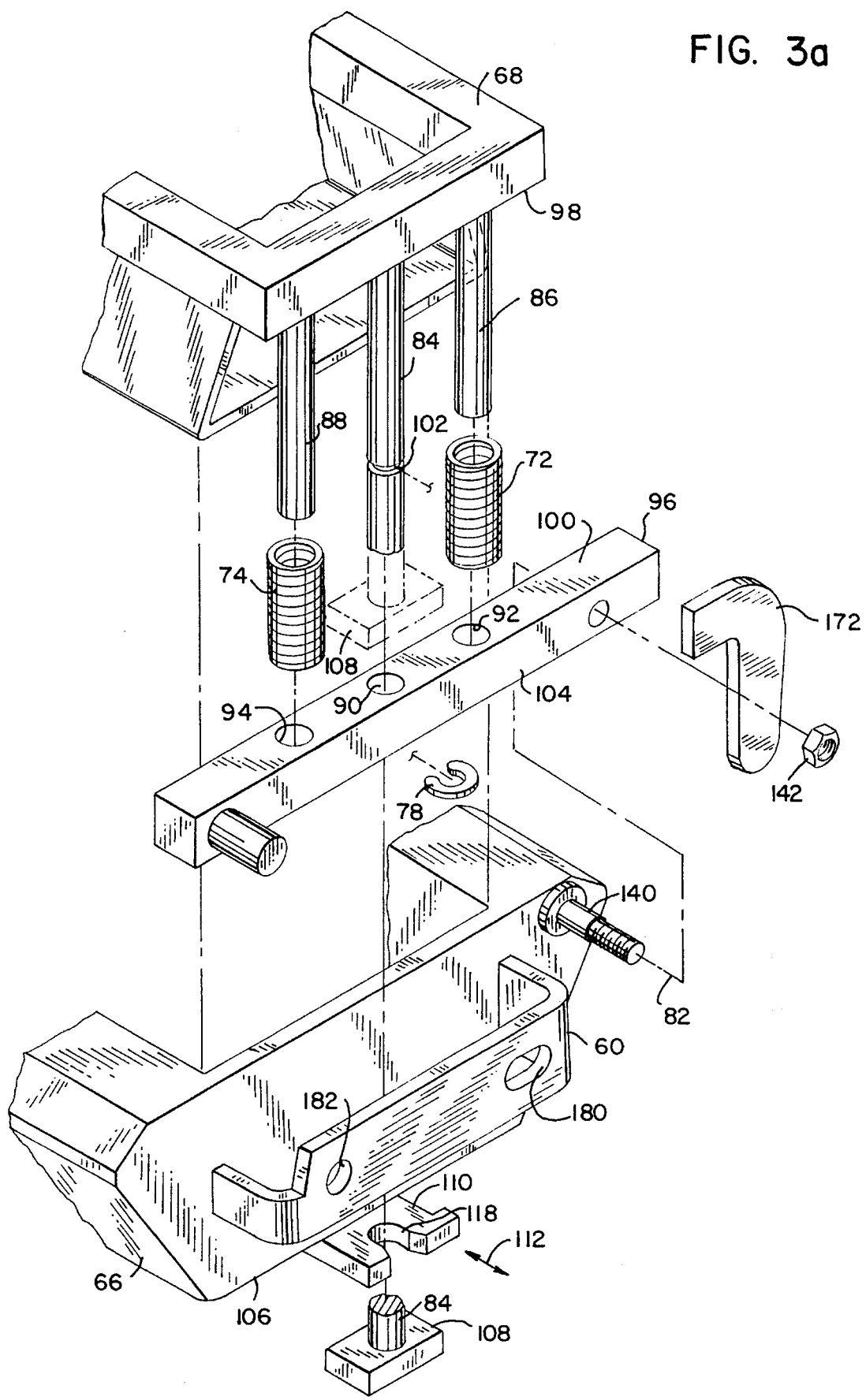
FIG. 3a is an exploded isometric view of a portion of the structure of FIG. 3.

Lid 68 at each end has rods 84, 86, 88, FIG. 3a, extend therefrom through respective apertures 90, 92, 94 in side bar 96. The apertures support and guide movement of the rods therethrough. Helical compression springs 72 and 74 encircle respective rods 86 and 88 and bear against the underside 98 of the lid and the top facing surface 100 of side bar 96, to bias lid 68 upwardly in the orientation of FIG. 3a to the noted partially open sprung position, FIGS. 10, 14, 17. The upward translational biased movement of lid 68 is stopped by retaining ring 78 in annular groove 102 of rod 84 engaging the underside 104 of side bar 96, FIGS. 3a, 10, 18. Rod 84 is longer than rods 86 and 88 and extends downwardly in FIGS. 3 and 3a below the bottom 106 of receptacle 66. The bottom end of rod 84 has a lower flange 108. A sliding catch 110 is movable along axis 112 in FIG. 3a and is mounted to the underside 106 of receptacle 66 by a guide channel 114, FIGS. 7 and 12.

Figure 5:
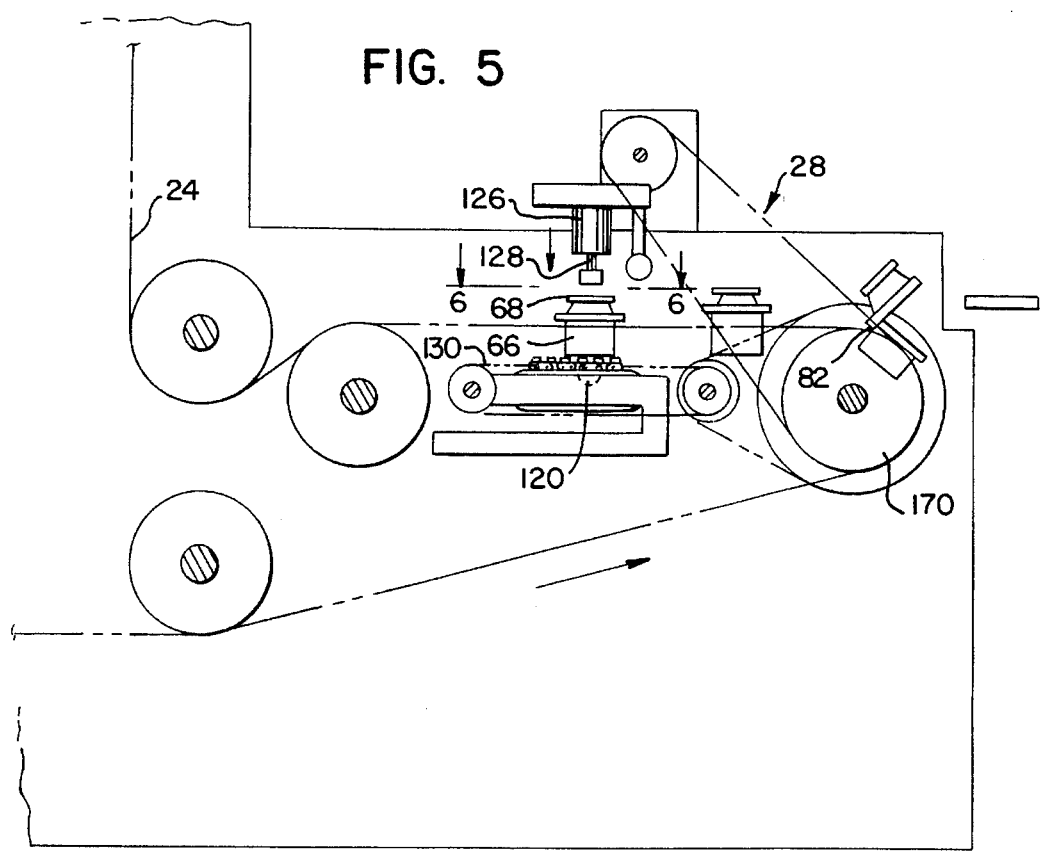
FIG. 5 is a partially schematic view illustrating the loading station of FIG. 1.
Figure 7:
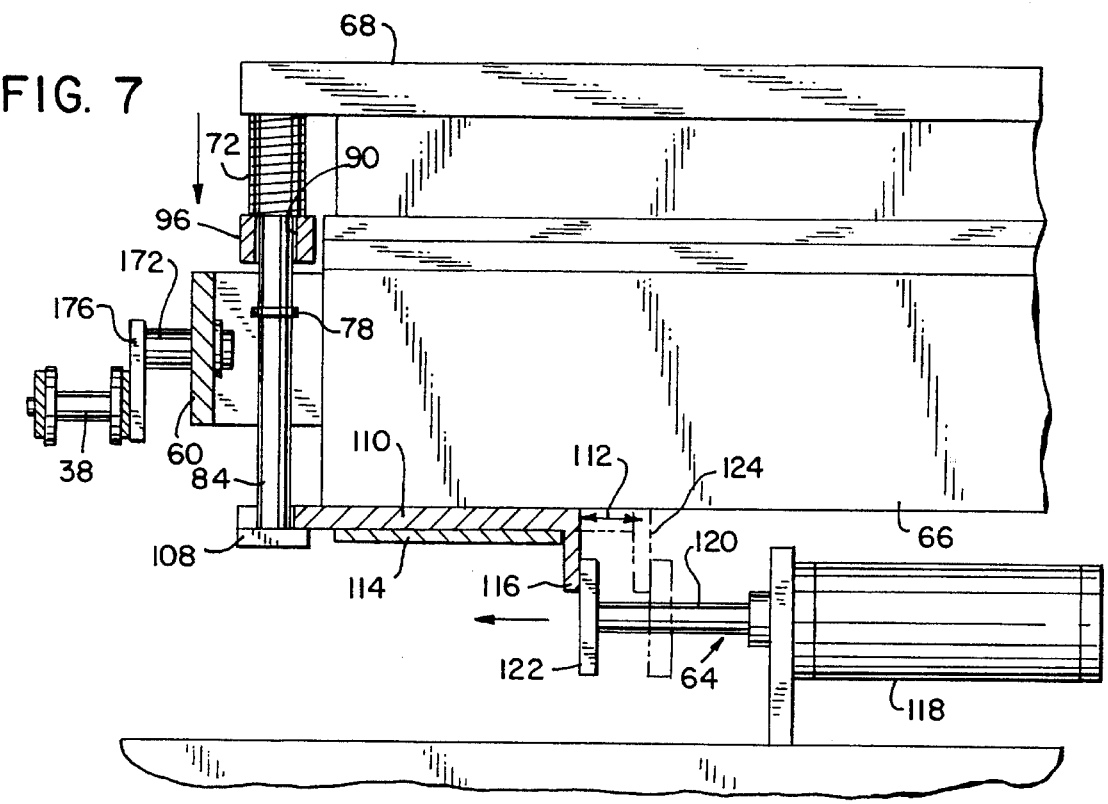
FIG. 7 is a sectional view taken along line 7—7 of FIG. 6.

At loading station 28, mold closer 64 pushes catch 110 at arm 116, FIG. 7, away from mold receptacle 66, i.e. leftwardly in FIG. 7, to engage rod 84 at jaws 118 of the catch, FIG. 3a, to hold lid 68 in the noted closed position by engagement of flange 108 against the underside of catch 110. Mold closer 64 is provided by a pneumatic or hydraulic cylinder 118, FIG. 7, actuatable to extend its plunger 120 leftwardly in FIG. 7 such that flange 122 on the left end of rod 120 engages arm 116 of catch 110 to push the catch leftwardly from the position shown in phantom at 124 to the position shown in solid line. Lid 68 is pushed downwardly at loading station 28 by pneumatic or hydraulic cylinder 126, FIG. 5, extending its plunger 128 to engage lid 68 and push the latter downwardly such that rod 84 moves downwardly, FIG. 7, and can be engaged by catch 110 at jaws 118. An auxiliary conveyor 130, FIG. 5, is provided at loading station 28 to support the underside of mold receptacle 66 during the downward translational pushing movement exerted by plunger 128 against lid 68.

After closing of the lid at loading station 28 as above described, the closed mold is carried and transported by conveyor 24 through chamber 22. Each mold is attached to the conveyor in a fixed orientation relative thereto, to be described, such that each mold changes between upwardly facing, sideways facing, and downwardly facing positions as it traverses along the serpentine path. At unloading station 30, mold opener 62 opens the mold and permits discharge of the food product 26, FIG. 8, onto a conveyor 132 for transport to a further processing system such as a downstream chiller or the like.

Figure 10:
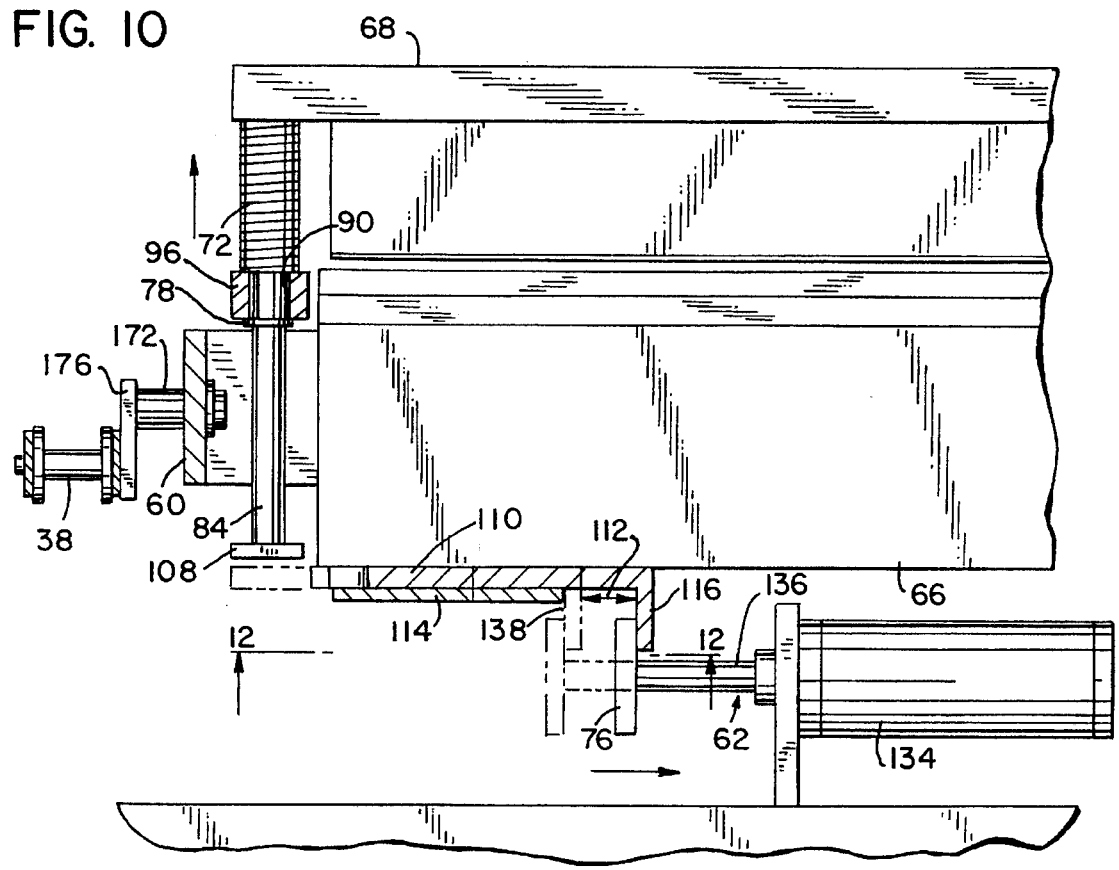
FIG. 10 is a sectional view taken along line 10—10 of FIG. 9.
Figure 11:
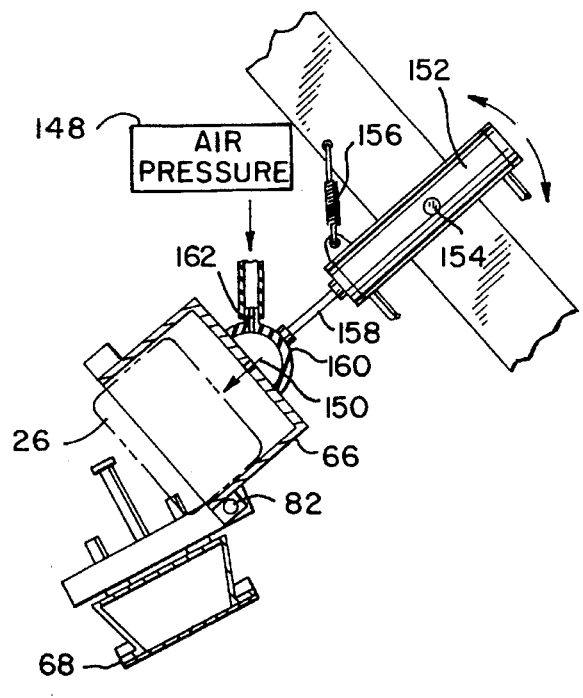
FIG. 11 is a partially sectional view of a portion of the structure of FIG. 8.

At unloading station 30, mold opener 62 includes a hydraulic cylinder 134, FIG. 10, actuatable to retract plunger 136 having release flange 76 at the end thereof to engage and pull arm 116 of catch 110 rightwardly in FIG. 10 from the position shown in phantom at 138 to the position shown in solid line. This rightward movement of catch 110 disengages the catch jaws 118 from rod 84, allowing the latter to move upwardly in FIG. 10 due to the bias of springs 72 and 74, until stopped by engagement of retainer ring 78 against the underside 104 of side bar 96. Lid 68 is now in the noted partially open sprung position, and is free to pivot about pivot axis 82. Side bar 96 is mounted to receptacle 66 at trunion 140, FIG. 3a, and held thereon by nut 142. Lid 68 pivots to the open position by gravity, FIGS. 8 and 11. As the conveyor traverses around sprocket 133, FIG. 8, the mold latch is engaged and released, FIG. 10, and the lid 68 moves from the closed position to the partially open sprung position. Retention member 80 adjacent sprocket 133 engages lid 68 in the partially open sprung position and prevents pivoting of the lid to the open position until the mold traverses past retention member 80 and along slope 144 along a travel path adjacent the bottom of the sprocket, and the lid is then permitted to pivot to the open position.

Figure 8:
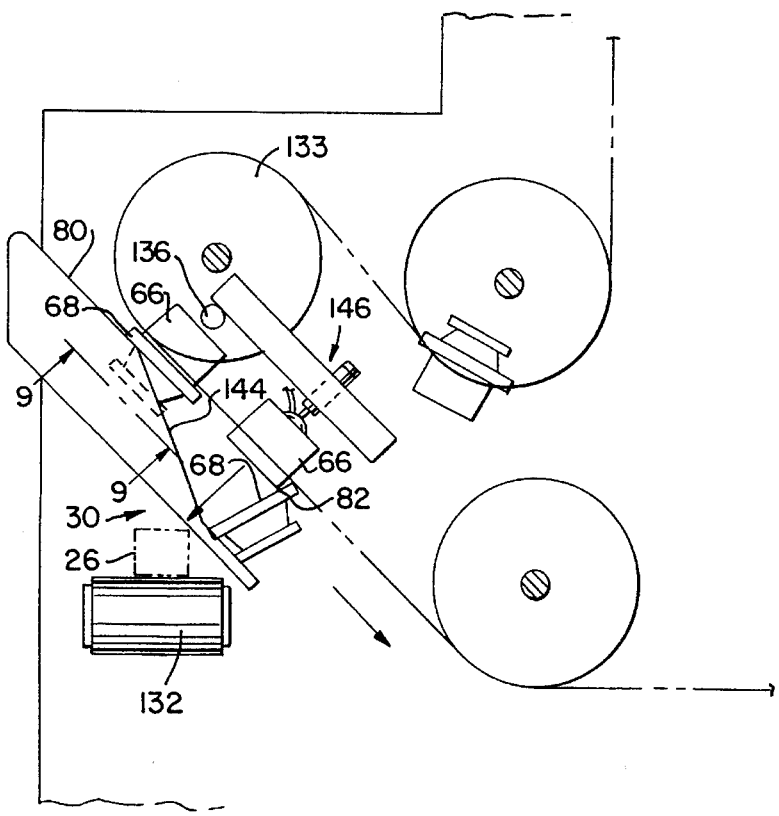
FIG. 8 is a partially schematic view illustrating the unloading station of FIG. 1.

At unloading station 30, the food product 26, FIG. 8, may be allowed to fall out of receptacle 66 by gravity, or may be pulled out by an operator. Preferably, however, an ejection mechanism 146 is provided at the unloading station. The ejection mechanism includes an air pressure source 148, FIG. 11, applying air pressure to an orifice 150 in the bottom of mold receptacle 66, to eject food product 26. A pneumatic or hydraulic cylinder 152 is mounted for limited pivotal movement about axis 154 at the unloading station and is centered by tension spring 156, and has an extendable plunger 158 with a rubber hemispherical cup 160 on its end engaging the underside of mold receptacle 66 and having a nipple 162 receiving pressurized air. Conveyor 24 moves slowly enough that plunger 158 can be extended and air pressure applied for a few seconds.

The mold travels from unloading station 30 to loading station 28 in a downwardly opening orientation of receptacle 66. Wash station 166, FIG. 1, and rinse station 168 are provided between unloading station 30 and loading station 28 and spray the downwardly opening mold receptacles from below.

At loading station 28, the conveyor traverses around a sprocket 170, FIG. 5, such that mold lid 68 pivots from the open position to the partially open sprung position. In one type of loading operation, the lid is manually held open by the operator while he loads the bagged ham product into receptacle 66, or the lid is manually reopened by the operator and the food product is loaded into the receptacle. Further alternatively, an auxiliary arm 172, FIG. 3a, is welded to side bar 96 and is engaged by a guide rail or the like (not shown) at the loading station during movement of the conveyor to pivot the lid back to the partially open sprung position prior to translational closing movement of the lid by hydraulic cylinder 126. Likewise, arm 172 may be engaged at unloading station 30 to pivot and positively open lid 68.

At loading station 28, the conveyor has an upper travel path adjacent the top of sprocket 170, and pneumatic or hydraulic cylinder plunger 128 provides a compression member along such upper travel path engaging the top of lid 68 and translationally moving the lid downwardly to the noted closed position, whereupon the latch engagement member provided by pneumatic or hydraulic cylinder plunger 120 and flange 122, FIG. 7, can engage and latch the mold latch. Auxiliary conveyor 130 provides a second compression member at the loading station engaging the bottom of the mold as a backstop therefor during downward translational movement of the lid by compression member 128. In an alternate embodiment, the upper compression member 128 may be provided by a further conveyor having a sloped or slanted undersurface engaging the top of lid 68 and gradually pushing the latter downwardly as the latter traverses leftwardly in FIG. 5 during movement of conveyor 24.

Mold mounting bracket 60, FIGS. 3 and 3a, is attached to chain 38 by a pair of chain link pins 173 and 174 which replace standard shorter length chain link pins such as 176. Pins 173 and 174 extend through respective apertures or slots 180 and 182 in bracket 60 and are retained by respective retainer rings 184 and 185 in respective annular grooves 186 and 188. The pair of pins 173 and 174 maintain the fixed orientation of the mold relative to the conveyor chains. Mold bracket 58 is comparably attached to conveyor chain 36.

The pins 173 and 174, FIG. 3, have a first distance 190, FIG. 4, therebetween when they are traversing with the conveyor chain along a straight run 192 between sprockets. The pins have a second shorter distance 194 therebetween when they are traversing with the conveyor chain along an arc 196 around a sprocket. At least one of the apertures or slots 180 and 182 is elongated, as shown at elongated slot 180, such that the respective pin 173 is permitted limited movement along such elongated slot 180 to accommodate the difference between distances 190 and 194 between pins 173 and 174 as the conveyor chain traverses along straight and arcuate portions 192 and 196, respectively, of its travel path.

It is recognized that various equivalence, alternatives and modifications are possible within the scope of the appended claims.

We claim:

1. A food processing system comprising:

a processing chamber;

a conveyor in said chamber for transporting a food product therethrough between a loading station and an unloading station;

a plurality of openable and closable food product molds carried by said conveyor through said chamber from said loading station to said unloading station and then returned by said conveyor from said unloading station to said loading station, each mold having open and closed conditions;

a plurality of biasing means each biasing a respective mold to said open condition;

a mold opener opening said mold at said unloading station;

a mold closer closing said mold at said loading station.

2. The invention according to claim 1 wherein said molds are attached directly to and carried by said conveyor.

3. The invention according to claim 1 wherein said mold is automatically opened by said mold opener during transport movement of said mold by said conveyor at said unloading station, and said mold is automatically closed by said mold closer during transport movement of said mold by said conveyor at said loading station.

4. The invention according to claim 1 wherein each mold comprises an open receptacle having a lid mounted thereto and movable between a first open position leaving said receptacle open, and a second closed position closing said receptacle.

5. The invention according to claim 4 wherein each receptacle further comprises a latch latching said lid in said closed position, said mold closer automatically closes said lid and latches said latch, and said mold opener automatically unlatches said latch.

6. A food processing system comprising:

a processing chamber;

a conveyor in said chamber for transporting a food product therethrough between a loading station and an unloading station;

a plurality of openable and closable food product molds carried by said conveyor through said chamber from said loading station to said unloading station and then returned by said conveyor from said unloading station to said loading station;

a mold opener opening said mold at said unloading station;

a mold closer closing said mold at said loading station;

wherein each mold comprises an open receptacle having a lid mounted thereto and movable between a first open position leaving said receptacle open, and a second closed position closing said receptacle;

wherein each receptacle further comprises a latch latching said lid in said closed position, said mold closer automatically closes said lid and latches said latch, and said mold opener automatically unlatches said latch;

wherein said latch is spring loaded and biased to an unlatched position, and wherein said mold opener includes a latch release engaging and releasing said latch, and a retainer retaining said lid in a partially open sprung position.

7. The invention according to claim 6 comprising a retention member engaging said lid in said partially open sprung position and preventing movement of said lid to said open position until said mold traverses past said retention member at said unloading station.

8. A food processing system comprising:

a processing chamber;

a conveyor in said chamber for transporting a food product therethrough between a loading station and an unloading station;

a plurality of openable and closable food product molds carried by said conveyor through said chamber from said loading station to said unloading station and then returned by said conveyor from said unloading station to said loading station;

a mold opener opening said mold at said unloading station;

a mold closer closing said mold at said loading station;

wherein each mold comprises an open receptacle having a lid mounted thereto and movable between a first open position leaving said receptacle open, and a second closed position closing said receptacle;

wherein said lid is mounted to said receptacle for compound movement including pivotal movement between an open position and a partially open sprung position, and translational movement between said partially open spring position and a closed position.

9. The invention according to claim 8 wherein said mold comprises a latch having a latched condition holding said lid in said closed position, and an unlatched condition releasing said lid to move to said partially open sprung position, and biasing means biasing said lid toward said partially open sprung position.

10. The invention according to claim 9 wherein said mold opener comprises a latch release engaging and releasing said latch such that said lid moves from said closed position to said partially open sprung position, a retainer retaining said lid in said partially open sprung position until said lid pivots to said open position.

11. The invention according to claim 10 wherein said conveyor traverses around a sprocket at said unloading station whereat said latch is engaged and released and said lid moves from said closed position to said partially open sprung position, and comprising a retention member adjacent said sprocket and engaging said lid in said partially open sprung position and preventing pivoting of said lid to said open position until said mold traverses past said retention member along a travel path adjacent the bottom of said sprocket and said lid is permitted to pivot to said open position.

12. The invention according to claim 4 wherein said mold travels from said unloading station to said loading station in a downwardly opening orientation of said receptacle, and comprising mold wash and rinse stations between said unloading and loading stations and spraying said downwardly opening receptacles from below.

13. The invention according to claim 9 wherein said conveyor traverses around a sprocket at said loading station such that said lid pivots from said open position to said partially open sprung position, and wherein said conveyor has an upper travel path adjacent to the top of said sprocket, and comprising a compression member along said upper travel path engaging the top of said lid and translationally moving said lid downwardly to said closed position, and a latch engagement member engaging and latching said latch.

14. The invention according to claim 13 comprising a second compression member at said loading station engaging the bottom of said mold as a backstop therefore during downward translational movement of said lid by said first mentioned compression member.

15. The invention according to claim 13 wherein said lid pivots to said open position at said unloading station due to gravity, and wherein said lid pivots from said open position to said partially open sprung position at said loading station by gravity.

16. The invention according to claim 1 wherein said conveyor comprises a pair of distally opposite chains conveyed around respective first and second sets of distally opposite sprockets, said mold extends transversely between said chains and is mounted thereto by respective brackets in a fixed orientation relative to said chains.

17. The invention according to claim 16 wherein each bracket is attached to a respective chain by a pair of pins to maintain said fixed orientation and prevent pivoting of said mold relative to said chains.

18. A food processing system comprising:
a processing chamber;
a conveyor in said chamber for transporting a food product therethrough between a loading station and an unloading station;
a plurality of openable and closable food product molds carried by said conveyor through said chamber from said loading station to said unloading station and then returned by said conveyor from said unloading station to said loading station;
a mold opener opening said mold at said unloading station;
a mold closer closing said mold at said loading station;
wherein said conveyor comprises a pair of distally opposite chains conveyed around respective first and second sets of distally opposite sprockets, said mold extends transversely between said chains and is mounted thereto by respective brackets in a fixed orientation relative to said chains;
wherein each bracket is attached to a respective chain by a pair of pins to maintain said fixed orientation and prevent pivoting of said mold relative to said chains;
wherein said pins have a first distance therebetween when they are traversing with said chain along a straight run between sprockets, and said pins have a second shorter distance therebetween when they are traversing with said chain along an arc around a sprocket, and wherein at least one of said pins extends through an elongated slot in said bracket such that said pin is permitted limited movement along said elongated slot to accommodate the difference between said first and second distances between said pins as said chain traverses along straight and arcuate portions of its travel path, respectively.

19. A food processing system comprising:
a processing chamber;
a conveyor in said chamber for transporting a food product therethrough between a loading station and an unloading station;
a plurality of openable and closable food product molds carried by said conveyor through said chamber from said loading station to said unloading station and then returned by said conveyor from said unloading station to said loading station;
a mold opener opening said mold at said unloading station;
a mold closer closing said mold at said loading station;
wherein said conveyor comprises a pair of distally opposite chains conveyed around respective first and second sets of distally opposite sprockets, said mold extends transversely between said chains and is mounted thereto by respective brackets in a fixed orientation relative to said chains; and
comprising first and second molds having first ends facing each other and mounted to each other in fixed orientation, and having second distally opposite ends each mounted to a respective one of said chains by a respective bracket, to provide a double mold system, with said chains being spaced from each other by twice the length of a mold.

20. A food processing system comprising;
a processing chamber;
a continuous serpentine conveyor in said chamber for transporting a food product therethrough between a loading station and an unloading station, said conveyor comprising a pair of distally opposite chains conveyed around respective first and second sets of distally opposite sprockets;
a plurality of openable and closeable food product molds carried by said conveyor through said chamber from said loading station to said unloading station and then returned by said conveyor from said unloading station to said loading station, each mold having open and closed conditions;
a plurality of biasing means each biasing a respective mold to said open condition;
a plurality of mounting means each mounting a respective mold transversely between said chains and in a fixed orientation relative thereto and preventing pivoting of said mold relative to said chains such that each mold rotates between upwardly facing, downwardly facing and sideways facing positions as it traverses along a serpentine path, the direction of bias of said biasing means likewise rotating with each said mold;

an automatic mold opener opening said mold with the aid of said biasing means at said unloading station and permitting discharge of food product from said mold when the latter is in a downwardly facing position;

an automatic mold closer closing said mold against the bias of said biasing means at said loading station when said receptacle is in an upwardly facing position and permitting loading of food product into said mold.

21. The invention according to claim 20 wherein said molds are attached directly to and carried by said conveyor.

22. The invention according to claim 20 wherein said conveyor comprises a return run between said unloading station and said loading station and carrying said mold therealong such that said receptacle is in a downwardly opening position, and comprising mold wash and rinse stations between said unloading station and said loading station and spraying said downwardly opening mold from below.

23. A food processing system comprising:

a processing chamber;

a continuous serpentine conveyor in said chamber for transporting a food product therethrough between a loading station and an unloading station;

a plurality of openable and closable food product molds carried by said conveyor through said chamber from said loading station to said unloading station and then returned by said conveyor from said unloading station to said loading station, each mold being attached to said conveyor in a fixed orientation relative thereto such that each mold rotates between upwardly facing, downwardly facing and sideways facing positions as it traverses along a serpentine path, each mold comprising an open receptacle having a lid mounted thereto and moveable between a first position leaving said receptacle open, and a second position closing said receptacle;

an automatic mold opener opening said mold at said unloading station and permitting discharge of food product from said mold when the latter is in a downwardly facing position;

an automatic mold closer closing said mold at said loading station when said receptacle is in an upwardly facing position and permitting loading of food product into said receptacle prior to said lid closing, wherein each mold has at least one orifice therein, and comprising an ejection mechanism at said unloading station comprising an air pressure source applied to said orifice when said lid is in said first open position, to eject food product from said receptacle.

* * * * *